(12) United States Patent
Adachi et al.

(10) Patent No.: US 11,703,015 B2
(45) Date of Patent: Jul. 18, 2023

(54) THREE-DIMENSIONAL ADDITIVE MANUFACTURED PRODUCT AND THREE-DIMENSIONAL ADDITIVE MANUFACTURING METHOD

(71) Applicant: MITSUBISHI HEAVY INDUSTRIES, LTD., Tokyo (JP)

(72) Inventors: Masaki Adachi, Tokyo (JP); Akira Ogawara, Tokyo (JP); Katsuhiko Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 306 days.

(21) Appl. No.: 16/634,331

(22) PCT Filed: Sep. 25, 2018

(86) PCT No.: PCT/JP2018/035424
§ 371 (c)(1),
(2) Date: Jan. 27, 2020

(87) PCT Pub. No.: WO2019/059401
PCT Pub. Date: Mar. 28, 2019

(65) Prior Publication Data
US 2020/0232418 A1    Jul. 23, 2020

(30) Foreign Application Priority Data

Sep. 25, 2017 (JP) ................... 2017-183607
Nov. 10, 2017 (JP) ................... 2017-217642

(51) Int. Cl.
*B22F 10/38* (2021.01)
*B28B 1/00* (2006.01)
(Continued)

(52) U.S. Cl.
CPC ............... *F02K 9/52* (2013.01); *B22F 10/28* (2021.01); *B22F 10/38* (2021.01); *B22F 10/385* (2021.01);
(Continued)

(58) Field of Classification Search
CPC .......................... B23K 9/04–048; B23P 6/007
See application file for complete search history.

(56) References Cited

U.S. PATENT DOCUMENTS

| 5,771,579 A | * | 6/1998 | Farhangi | ............... F02K 9/52 29/890.01 |
| 6,253,539 B1 | * | 7/2001 | Farhangi | ............... F02K 9/52 60/211 |
| 2017/0096967 A1 | | 4/2017 | Bostwick et al. | |

FOREIGN PATENT DOCUMENTS

| CN | 103867340 A | * | 6/2014 |
| DE | 10 2015 209641 | | 12/2016 |

(Continued)

OTHER PUBLICATIONS

Extended European Search Report dated Mar. 30, 2020 in corresponding European Patent Application No. 18858668.9.
(Continued)

*Primary Examiner* — Jacob J Cigna
(74) *Attorney, Agent, or Firm* — Wenderoth, Lind & Ponack, L.L.P.

(57) ABSTRACT

A three-dimensional additive manufactured product includes a body portion and a male screw portion integrally disposed on a surface of the body portion so as to protrude therefrom. The male screw portion includes a following side flank forming a first flank angle with respect to a vertical plane to an axis thereof. The first flank angle is not less than 45 degrees.

6 Claims, 6 Drawing Sheets

(51) Int. Cl.
- B33Y 80/00 (2015.01)
- F02K 9/52 (2006.01)
- F02M 61/00 (2006.01)
- B22F 10/28 (2021.01)
- B33Y 10/00 (2015.01)

(52) U.S. Cl.
CPC .............. *B28B 1/001* (2013.01); *B33Y 10/00* (2014.12); *B33Y 80/00* (2014.12); *F02M 61/00* (2013.01); *F05D 2230/31* (2013.01)

(56) References Cited

FOREIGN PATENT DOCUMENTS

| JP | 2003-269254 | 9/2003 |
|----|-------------|--------|
| WO | 2012/166552 | 12/2012 |

OTHER PUBLICATIONS

Eiki Martinson:" Mechanical Design for 3D Printing—the Adventures of Eiki Martinson" dated Nov. 30, 2012.

"Buttress Thread—Wikipedia", Nov. 21, 2006, XP055677946, Retrieved from the Internet: URL:https://en.wikipedia.org/wiki/Buttress_thread.

International Search Report dated Oct. 30, 2018 in International (PCT) Application No. PCT/JP2018/035424.

* cited by examiner

THREE-DIMENSIONAL ADDITIVE MANUFACTURED PRODUCT AND THREE-DIMENSIONAL ADDITIVE MANUFACTURING METHOD

TECHNICAL FIELD

The present disclosure relates to a three-dimensional additive manufactured product manufacturable through additive manufacturing by irradiating a laid powder material with a beam such as a light beam or an electronic beam and a three-dimensional additive manufacturing method for manufacturing the three-dimensional additive manufactured product.

BACKGROUND

A so-called 3D printer technology of a lamination type is known, which manufactures a three-dimensional additive manufactured product through additive manufacturing by irradiating powder materials laid in layers with a beam such as a light beam, an electronic beam, or the like. In the technology, the three-dimensional additive manufactured product is molded by forming a sintered layer by irradiating a powder bed formed with the powder materials with a beam and integrally laminating a plurality of sintered layers by repeatedly forming the sintered layers.

Such a 3D printer technology has been developed recently as a method of manufacturing various modeled product. As one of its applications, for example, a fuel injection element is considered, which is used for a fuel injector of a liquid rocket engine described in Patent Document 1. The fuel injection element is conventionally manufactured by combining a plurality of components produced through a machine, and thus a cost is likely to increase. However, adopting the 3D printer technology, a large cost reduction is expected.

CITATION LIST

Patent Literature

Patent Document 1: JP2003-269254A

SUMMARY

Technical Problem

In the 3D printer technology of the lamination type, surface roughness may increase when an overhang shape is included in which the size of a modeled product increases toward an upper-layer side when lamination is performed gradually from a lower-layer side. In the fuel injection element as in Patent Document 1, a male screw portion to be engaged with a peripheral member may be formed integrally with an element body. If this is to be formed by the 3D printer technology, the overhang shape may be included in an uneven shape of the male screw portion to no small extent.

FIG. 6 is a schematic view showing a cross-sectional shape of a male screw portion 22 included in a conventional fuel injection element 2. The male screw portion 22 has a single-thread screw structure with an outer diameter a, a root diameter b, a pitch p, and an effective diameter d. The male screw portion 22 includes a leading side flank 34 and a following side flank 36 on the opposite side of the leading side flank 34. The leading side flank 34 faces a traveling direction when screwed into a peripheral member (not shown) having a corresponding female screw structure. If the male screw portion 22 is modeled integrally with the body portion of the fuel injection element 2 by the 3D printer technology of the lamination type, the following side flank 36 has an overhang shape. Assume that the following side flank 36 has an overhang angle θ with respect to an axis C of the male screw portion 22, surface roughness of the following side flank 36 increases if the overhang angle θ is not less than 45 degrees, making it impossible to withstand practical use (FIG. 6 exemplifies a case in which the overhang angle θ is 60 degrees).

Thus, if the fuel injection element 2 as in FIG. 6 is molded integrally by the 3D printer technology, the male screw portion 22 needs to have the overhang angle θ of less than 45 degrees, as shown in FIG. 7. However, if the overhang angle θ is decreased, the male screw portion 22 has an increased length L in order to ensure the number of pitches similar to the case of FIG. 6, resulting in upsizing a product.

For this reason, when the fuel injection element 2 is manufactured by the conventional 3D printer technology, the manufacture has to be completed by molding only the body portion of the fuel injection element 2 by the 3D printer technology and mounting the male screw portion 22 prepared as a separate member to the body portion. Consequently, the number of manufacturing processes increases, making it impossible to obtain a sufficient cost reduction effect by the 3D printer technology.

At least one embodiment of the present invention was made in view of the above, and an object of the present invention is to provide a three-dimensional additive manufactured product and a three-dimensional additive manufacturing method capable of effectively reducing a manufacturing cost while molding the male screw portion integrally with the body portion by using the 3D printer technology of the lamination type.

Solution to Problem (1) In order to solve the above-described problems, a three-dimensional additive manufactured product according to at least one embodiment of the present invention includes a body portion, and a male screw portion integrally disposed on a surface of the body portion so as to protrude therefrom. The male screw portion includes a following side flank forming a first flank angle with respect to a vertical plane to an axis of the male screw portion. The first flank angle is not less than 45 degrees.

With the above configuration (1), since the first flank angle formed by the following side flank with respect to the vertical plane to the axis is not less than 45 degrees, it is possible to keep an overhang angle formed by the male screw portion under 45 degrees. Thus, surface roughness of the male screw portion can be kept within a practical range when formed by a 3D printer technology, making it possible to form the male screw portion integrally with the body portion. As a result, it is possible to reduce the number of manufacturing processes and to obtain a three-dimensional additive manufactured product which is more advantageous in terms of cost.

(2) In some embodiments, in the above configuration (1), the male screw portion includes a leading side flank forming a second flank angle with respect to the vertical plane, and the second flank angle is smaller than the first flank angle.

With the above configuration (2), the second flank angle of the leading side flank is smaller than the first flank angle of the following side flank. Thus, it is possible to suppress the length of the male screw portion in the axial direction, and thus to avoid upsizing of a product.

(3) In some embodiments, in the above configuration (2), the second flank angle is zero degrees.

With the above configuration (3), since the second flank angle is zero degrees, the leading side flank of the male screw portion is parallel to the vertical plane to the axis, making it possible to minimize the length of the male screw portion along the axial direction. As a result, it is possible to obtain a more compact three-dimensional additive manufactured product.

(4) In some embodiments, in any one of the above configurations (1) to (3), the first flank angle is not more than 70 degrees.

With the above configuration (4), the first flank angle has an upper limit value of 70 degrees. It is advantageous that the overhang angle can further be decreased as the first flank angle increases. By contrast, however, durability to an axial force generated when the male screw portion is engaged is weakened. Considering the durability to the axial force, the first flank angle is preferably not more than 70 degrees.

(5) In some embodiments, in any one of the above configurations (1) to (4), the following side flank has surface roughness with arithmetic average roughness (Ra) of not more than 700 microinches.

With the above configuration (5), surface roughness of the following side flank forming the overhang angle with respect to the vertical plane to the axis has arithmetic average roughness (Ra) of not more than 700 microinches. Such surface roughness falls within a practical range by keeping the overhang angle under 45 degrees by setting the first flank angle to not less than 45 degrees.

(6) In some embodiments, in any one of the above configurations (1) to (5), the body portion is a fuel injection element used for a fuel injector of a liquid rocket engine, and the male screw portion is configured to engage with a nut including a female screw portion to be able to interpose a predetermined functional member between the body portion and the nut.

With the above configuration (6), the above-described three-dimensional additive manufactured product (including the above-described various aspects) is the fuel injection element used for the fuel injector of the liquid rocket engine. The fuel injection element is conventionally manufactured by combining a plurality of components produced through a machine, resulting in a high cost. However, since the fuel injection element is formed by the 3D printer technology as described above, it is possible to reduce the high cost. In addition, since it is possible to decrease the overhang angle by setting the first flank angle of the male screw portion to not less than 45 degrees, it is possible to keep surface roughness of the following side flank within the practical range. Thus, it is possible to form the male screw portion integrally with the body portion and to reduce the number of manufacturing processes as well.

(7) In order to solve the above-described problems, a three-dimensional additive manufacturing method according to at least one embodiment of the present invention is a three-dimensional additive manufacturing method for performing additive manufacturing of a three-dimensional additive manufactured product which includes a body portion and a male screw portion integrally disposed on a surface of the body portion so as to protrude therefrom by irradiating a powder bed with a beam. A first flank angle formed by a following side flank with respect to a vertical plane to an axis of the male screw portion is formed at not less than 45 degrees.

With the above method (7), it is possible to suitably manufacture the above-described three-dimensional additive manufactured product (including the above-described various aspects).

Advantageous Effects

According to at least one embodiment of the present invention, it is possible to provide a three-dimensional additive manufactured product and a three-dimensional additive manufacturing method capable of effectively reducing a manufacturing cost while molding a screw portion integrally with a body portion by using a 3D printer technology.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
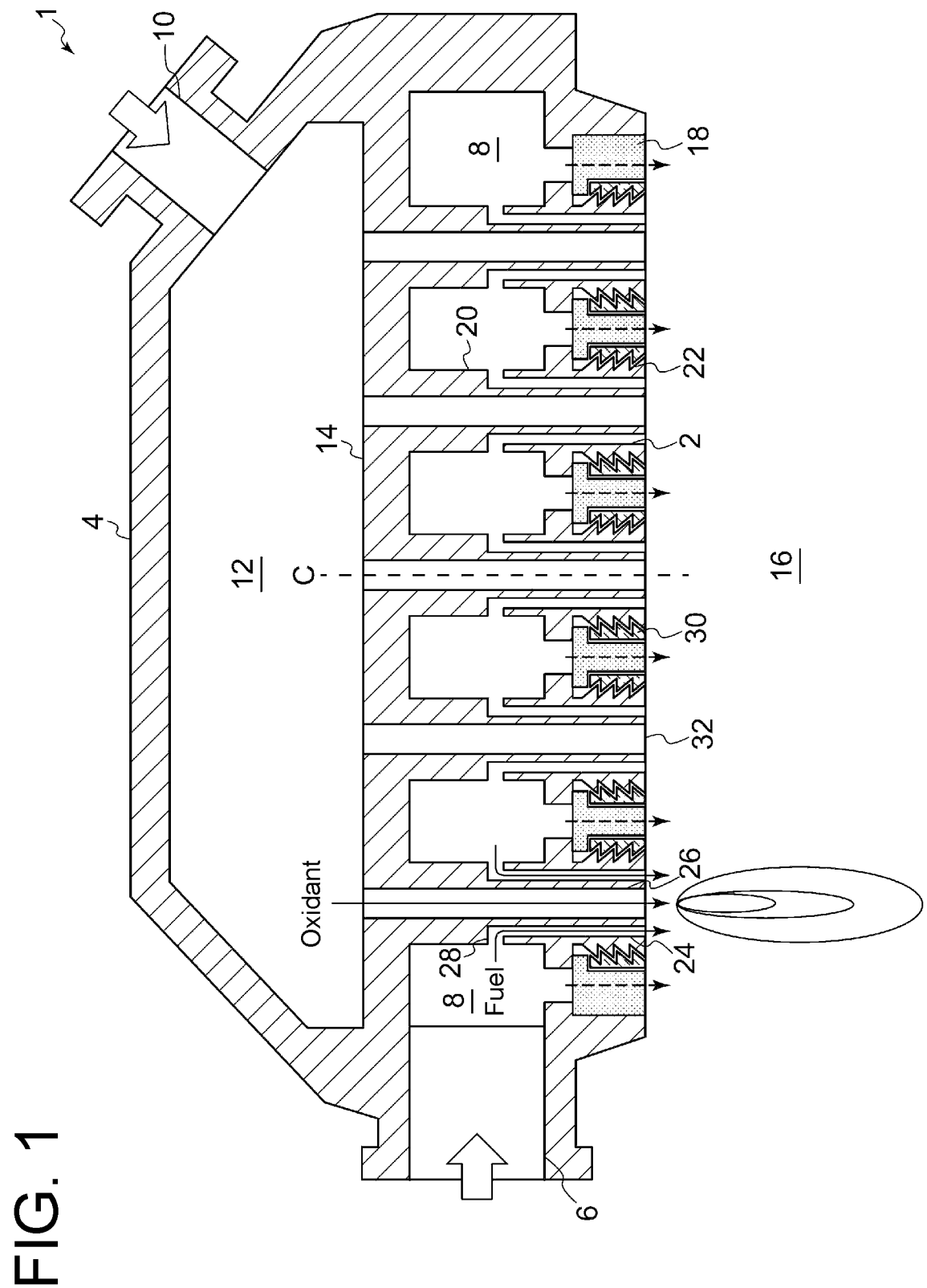
FIG. 1 is a cross-sectional view showing the internal structure of a fuel injector of a liquid rocket engine for which a three-dimensional additive manufactured product is used according to at least one embodiment of the present invention.

FIG. 1 is a cross-sectional view showing the internal structure of a fuel injector 1 of a liquid rocket engine for which a three-dimensional additive manufactured product is used according to at least one embodiment of the present invention. Embodiments below will be described by taking, as an example, the fuel injection element 2 serving as one component used for the fuel injector 1 of the liquid rocket engine as one embodiment of the three-dimensional additive manufactured product according to the present invention. However, it goes without saying that another member may be used as an example.

The liquid rocket engine includes a combustor which combusts an oxidant and fuel made from hydrogen or the like, a nozzle which generates a thrust force by expanding and accelerating a combustion gas generated by the combustor, and a propellant supply system which feeds a propellant in a tank to the combustor. The propellant supply system includes the fuel injector 1 which mixes the oxidant and the fuel accumulated in the propellant tank to inject the obtained mixture into the combustor.

As shown in FIG. 1, the fuel injector 1 includes a housing 4 formed integrally with or separately from the fuel injection elements 2 each having a circular cross-section. The housing 4 defines hydrogen chambers 8 to which liquid hydrogen is supplied from the propellant tank via a hydrogen supply passage 6 and an oxygen chamber 12 to which liquid oxygen is supplied from the propellant tank via an oxygen supply passage 10. The plurality of fuel injection elements 2 are formed so as to protrude downward from a partition wall 14 arranged between the hydrogen chambers 8 and the oxygen chamber 12. On the tip side of each of the fuel injection elements 2, a face plate 18 is fixed, which partitions the hydrogen chamber 8 and a combustion chamber 16 defined in the combustor.

The fuel injection elements 2 each include a body portion 20 extending along the axial direction and the male screw portion 22 formed integrally with the body portion 20 on the tip side of the body portion 20. The body portion 20 includes a liquid hydrogen post 24 and a liquid oxygen post 26. The liquid hydrogen post 24 forms a flow passage for making the hydrogen chamber 8 and the combustion chamber 16 communicate with each other, and supplying liquid hydrogen from the hydrogen chamber 8 to the combustion chamber 16. The liquid oxygen post 26 forms a flow passage for making the oxygen chamber 12 and the combustion chamber 16 communicate with each other, and supplying liquid oxygen from the oxygen chamber 12 to the combustion chamber 16. The liquid oxygen post 26 is formed so as to pass through the center of the fuel injection element 2 along the axis C. The liquid hydrogen post 24 is formed so as to communicate with the combustion chamber 16 through the periphery of the liquid oxygen post 26 from a slit 28 opened to the hydrogen chamber 8 in a side wall of the body portion 20.

Moreover, the male screw portion 22 of each of the fuel injection elements 2 is arranged concentrically with the body portion 20 and extends downward from the body portion 20 along the axis C. The male screw portion 22 has a male screw structure with screw threads disposed at a predetermined pitch. The male screw portion 22 is fitted with a nut 30 having a corresponding female screw structure. The above-described face plate 18 is interposed between the nut 30 and the male screw portion 22.

The face plate 18 interposed between the male screw portion 22 and the nut 30 is arranged so as to partially contact the liquid hydrogen stored in the hydrogen chamber 8. The face plate 18 is a functional member formed of a porous material and is configured to be able to cool an injection surface 32 of the fuel injection element 2 by partially transmitted (seeped) liquid hydrogen stored in the hydrogen chamber 8.

Figure 2:
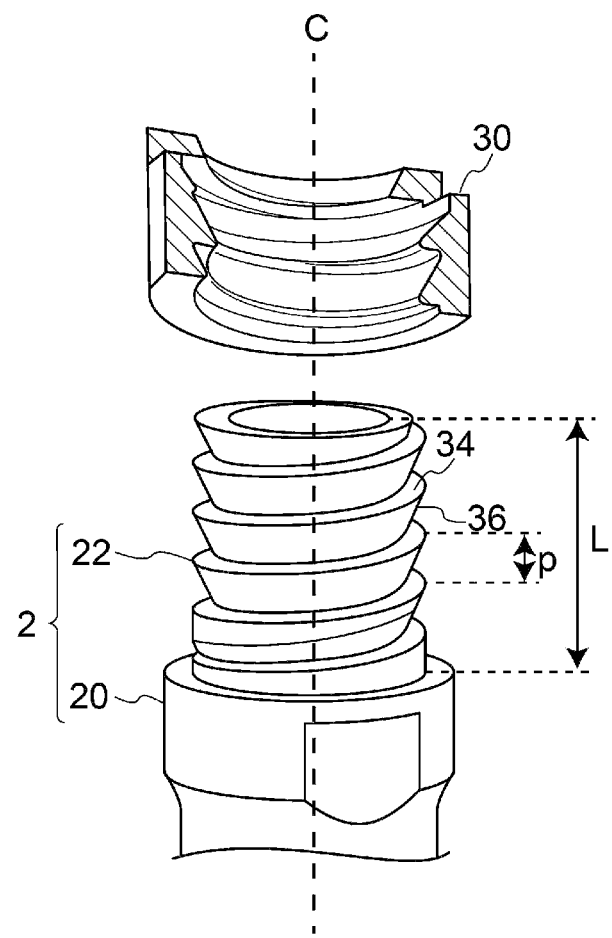
FIG. 2 is an enlarged perspective view showing a male screw portion in FIG. 1 separately from a nut.
Figure 3:
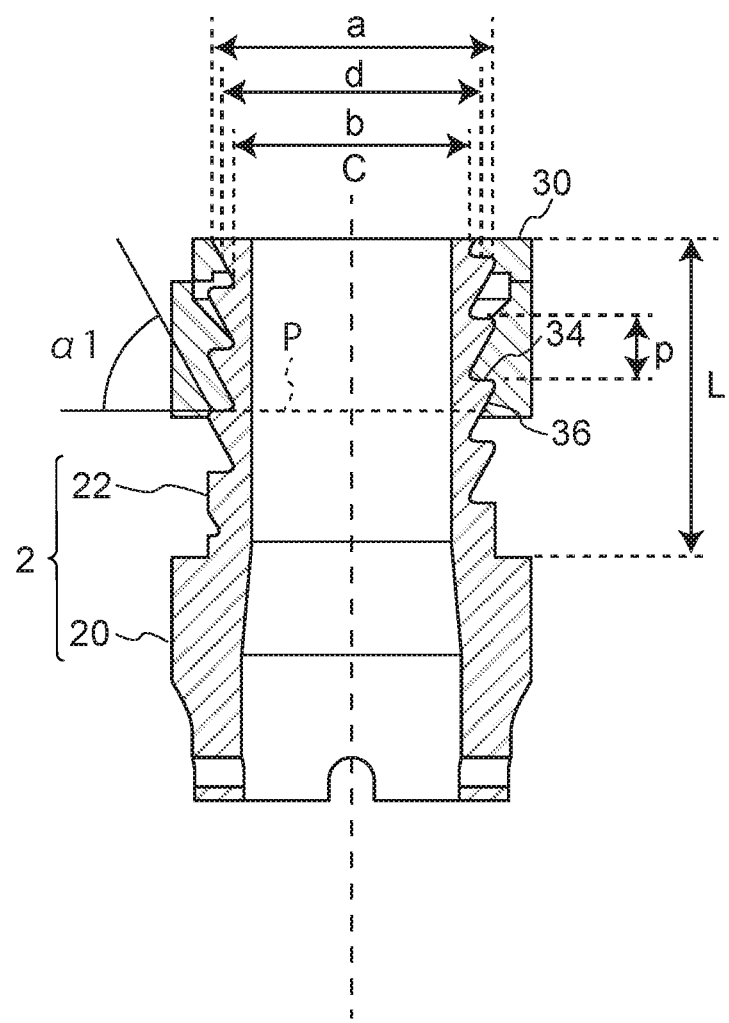
FIG. 3 is a cross-sectional view showing the cross-sectional structure of the male screw portion in FIG. 1 fitted to the nut.

FIG. 2 is an enlarged perspective view showing the male screw portion 22 in FIG. 1 separately from the nut 30. FIG. 3 is a cross-sectional view showing the cross-sectional structure of the male screw portion 22 in FIG. 1 fitted to the nut 30.

The male screw portion 22 is a single-thread screw having a male screw structure with the outer diameter a, the root diameter b, the pitch p, and the effective diameter d, and has a shape corresponding to the female screw structure formed in the nut 30. The male screw portion 22 includes the leading side flank 34 facing the traveling direction when screwed into the nut 30 and the following side flank 36 on the opposite side of the leading side flank 34.

As shown in FIG. 3, a first flank angle $\alpha 1$ and a second flank angle $\alpha 2$ (not shown in FIG. 3 because $\alpha 2=0$) are defined. The first flank angle $\alpha 1$ is an angle of the following side flank 36 with respect to a vertical plane P to the axis C of the male screw portion 22. The second flank angle $\alpha 2$ is an angle of the leading side flank 34 with respect to the vertical plane P to the axis C of the male screw portion 22. Moreover, as will be described later with reference to FIG. 4, the fuel injection element 2 is molded by additive manufacturing from the body portion 20 toward the male screw portion 22 along the vertical plane P. Thus, the overhang angle $\theta$ at the time of additive manufacturing is defined as the angle of the following side flank 36 with respect to the axis C and is equal to $(90-\alpha 1)$ degrees.

The first flank angle $\alpha 1$ is set to not less than 45 degrees, keeping the overhang angle $\theta$ $(=90-\alpha 1)$ under 45 degrees. In the present embodiment, an example is shown in which the first flank angle $\alpha 1$ is set to 60 degrees. Therefore, the overhang angle $\theta$ is 30 degrees. Thus, surface roughness of the male screw portion 22 is kept within a practical range when formed by the 3D printer technology. According to a research by the present inventor, surface roughness of the following side flank 36 forming the overhang angle $\theta$ has arithmetic average roughness (Ra) of not more than 700 microinches.

The first flank angle $\alpha 1$ is preferably not more than 70 degrees. It is advantageous that the overhang angle $\theta$ formed by the following side flank 36 with respect to the vertical plane P to the axis C can further be decreased as the first flank angle $\alpha 1$ increases. By contrast, however, durability to an axial force generated when the male screw portion 22 is engaged with the nut 30 is weakened. Considering the durability to the axial force, the first flank angle $\alpha 1$ is preferably not more than 70 degrees.

Furthermore, the second flank angle $\alpha 2$ is set smaller than the first flank angle $\alpha 1$. Thus, it is possible to suppress the length L of the male screw portion 22 in the direction of the axis C. In the present embodiment, a case is exemplified in which the second flank angle $\alpha 2$ is set to zero degrees (in other words, the leading side flank 34 is formed to be the vertical plane P to the axis C). Thus, the leading side flank 36 of the male screw portion 22 is parallel to the vertical plane P to the axis C, and the length L of the male screw portion 22 along the direction of the axis C can be minimized, allowing a more compact configuration.

Figure 4:
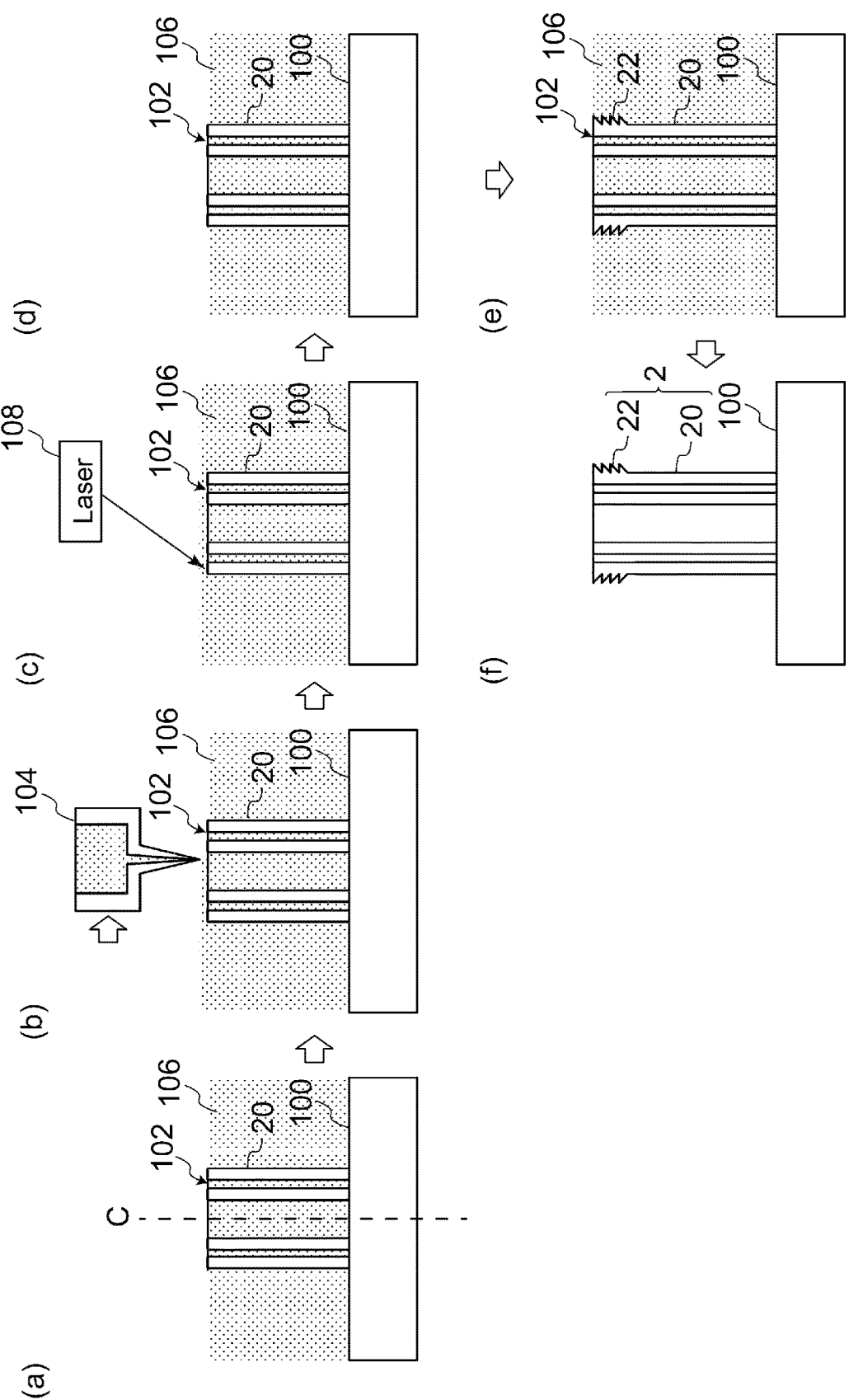
FIG. 4 is an explanatory view showing, in stages, a modeling process by a three-dimensional additive manufacturing method according to at least one embodiment of the present invention.

Subsequently, a method of manufacturing the fuel injection element 2 having the above-described configuration will be described with reference to FIG. 4. FIG. 4 is an explanatory view showing, in stages, a modeling process by a three-dimensional additive manufacturing method according to at least one embodiment of the present invention.

In the present embodiment, molding is started with the body portion 20 (upper side in FIGS. 2 and 3) of the fuel injection element 2 having a relatively large capacity, and then the male screw portion 22 having a relatively small capacity is molded. Molding in this order, it is possible to keep the overhang shape in the three-dimensional additive manufactured product small and to achieve high-quality molding. In (a) of FIG. 4, an intermediate state in which the body portion 20 of the fuel injection element 2 is molded halfway is shown as an initial state.

As shown in (b) of FIG. 4, molding of the body portion 20 is performed through formation of a power bed 106 by laying, in layers, powder materials supplied from a recoater 104 to a modeling surface 102 on a base plate 100 serving as a base. Then, as shown in (c) of FIG. 4, the powder materials are selectively hardened by scanning on the modeling surface 102 while irradiating the power bed 106 with a beam 108 such as a light beam or an electronic beam from a beam emitting unit (not shown).

The powder materials are powdery substances to be raw materials of the three-dimensional additive manufactured product. It is possible to widely adopt, for example, a metal material such as iron, copper, aluminum, or titanium, or a non-metal material such as ceramic.

The base plate 100 is configured to be able to be lifted/lowered along the vertical direction. Molding of the body portion 20 is advanced by repeating a forming step of the power bed 106 shown in (b) of FIG. 4 and an irradiating step with the beam 108 shown in (c) of FIG. 4 while lifting/lowering the base plate 100.

Upon completion of the body portion 20 as shown in (d) of FIG. 4, then, molding of the male screw portion 22 is performed sequentially from molding of the body portion 20. Similarly to the body portion 20, molding of the male screw portion 22 is basically performed by repeating formation of the power bed 106 and beam irradiation with respect to the modeling surface 102. As described above with reference to FIGS. 2 and 3, the male screw portion 22 has the overhang shape in the following side flank 36. Thus, in molding the male screw portion 22, formation of the power bed 106 and beam irradiation are repeated such that the first flank angle $\alpha1$ is not less than 45 degrees, keeping the overhang angle $\theta$ not more than 45 degrees. Accordingly, surface roughness of the following side flank 36 has arithmetic average roughness (Ra) of not more than 700 microinches, making it possible to withstand practical use.

It is preferable that durability to the axial force is sufficiently ensured by molding the male screw portion 22 such that the overhang angle $\theta$ is not more than 70 degrees, as described above. Moreover, it is preferable that the length L of the male screw portion 22 in the direction of the axis C is suppressed by molding the male screw portion 22 such that the second flank angle $\alpha2$ is smaller than the first flank angle $\alpha1$. Thus suppressing the length L, it is possible to shorten a molding time required for additive manufacturing, which is effective for a cost reduction. More preferably, the length L can be minimized by performing molding such that the second flank angle $\alpha2$ is zero degrees.

When molding of the male screw portion 22 is completed as shown in (e) of FIG. 4, the powder materials remaining around the molded fuel injection element 2 is removed, completing the fuel injection element 2 (see (f) of FIG. 4).

Figure 5:
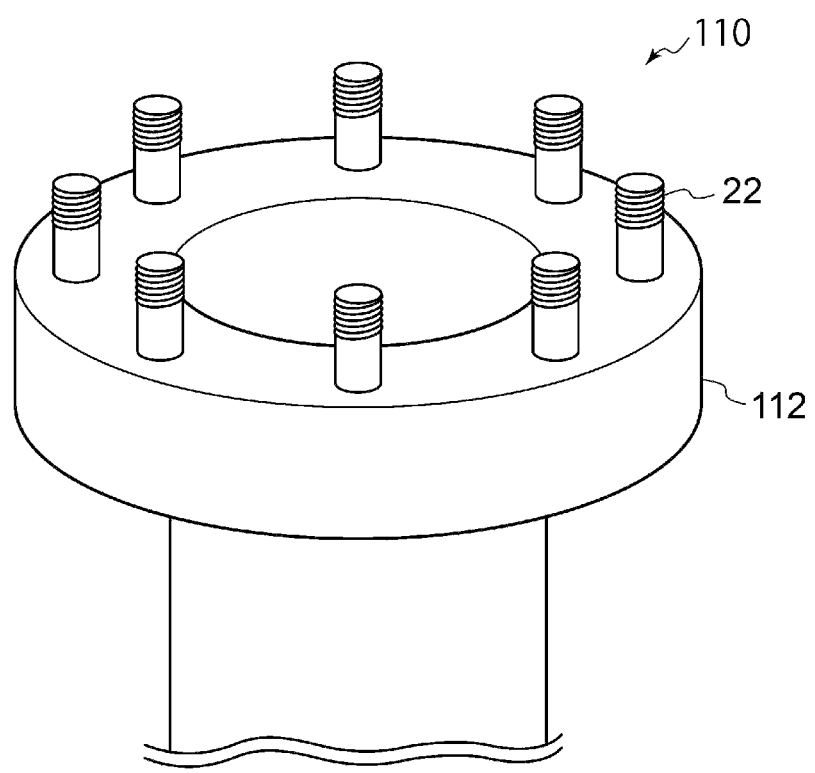
FIG. 5 is a view showing another example of a three-dimensional additive manufactured product to be modeled by the three-dimensional additive manufacturing method of FIG. 4.
Figure 6:
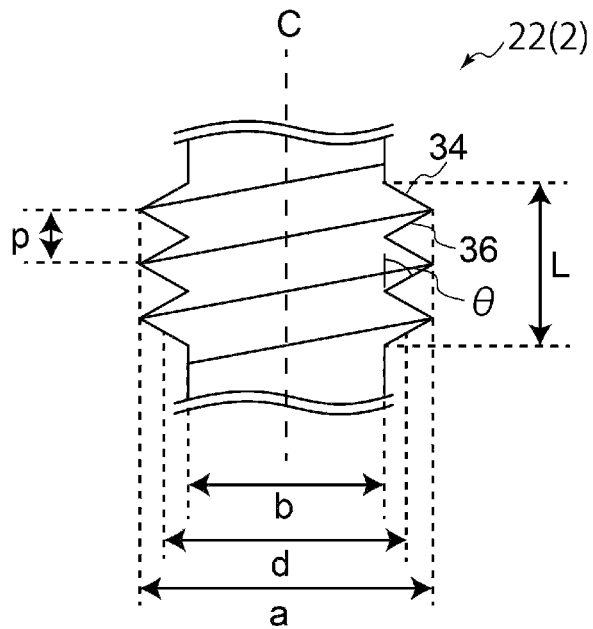
FIG. 6 is a schematic view showing the cross-sectional shape of the male screw portion included in the conventional fuel injection element.
Figure 7:
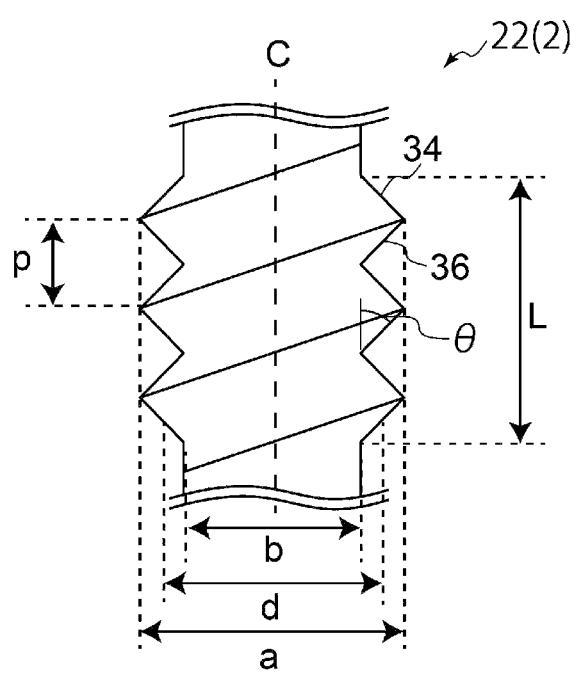
FIG. 7 is a view showing a modified example of FIG. 6.

FIG. 5 is a view showing another example of a three-dimensional additive manufactured product 110 to be modeled by the three-dimensional additive manufacturing method of FIG. 4. Similarly to the aforementioned fuel injection element 2, the male screw portions 22 of the three-dimensional additive manufactured product 110 are modeled integrally with a flange portion 112 on a body side, and in particular, the plurality of male screw portions 22 are disposed along the circumferential direction of the flange portion 112. Three-dimensional additive manufacturing is also performed on the three-dimensional additive manufactured product from the flange portion 112 on the body side toward the plurality of male screw portions 22 at the time of modeling. Each of the plurality of male screw portions 22 is modeled such that at least one of the first flank angle $\alpha1$ and the second flank angle $\alpha2$ has the aforementioned angular range, making it possible to suppress the overhang angle $\theta$, as in the aforementioned embodiment.

As described above, according to the present embodiment, it is possible to provide the three-dimensional additive manufactured product and the three-dimensional additive manufacturing method capable of effectively reducing the manufacturing cost while molding the male screw portion 22 integrally with the body portion 20 by using the 3D printer technology of the lamination type.

INDUSTRIAL APPLICABILITY

At least one embodiment of the present invention can be utilized for a three-dimensional additive manufactured product manufacturable through additive manufacturing by irradiating laid powder with a beam such as a light beam or an electronic beam and a three-dimensional additive manufacturing method for manufacturing the three-dimensional additive manufactured product.

REFERENCE SIGNS LIST

1 Fuel injector
2 Fuel injection element
4 Housing
6 Hydrogen supply passage
8 Hydrogen chamber
10 Oxygen supply passage
12 Oxygen chamber
14 Partition wall
16 Combustion chamber
18 Face plate
20 Body portion
22 Male screw portion
24 Liquid hydrogen post
26 Liquid oxygen post
28 Slit
30 Nut
32 Injection surface
34 Leading side flank
36 Following side flank
100 Base plate
102 Modeling surface
104 Recoater
106 Powder bed
108 Beam
110 Three-dimensional additive manufactured product
112 Flange portion

The invention claimed is:
1. A fuel injector comprising:
a three-dimensional additive manufactured product, comprising:
a base portion having a base surface;
a plurality of projections formed integrally with the base portion so as to protrude from the base surface and extend in an axial direction of each of the projections, the plurality of projections forming a plurality of respective fuel injection elements for injecting fuel, wherein each projection of the plurality of projections includes a male screw portion on an outer surface of the projection, the male screw portion including a following side flank forming a first flank angle with respect to a plane that is perpendicular to the axial direction;

a porous plate for seeping the fuel to cool an injection surface of each of the fuel injection elements; and a plurality of nuts, each nut having a female screw portion screwed onto the male thread portion of a respective one of the fuel injection elements such that the porous plate is interposed between the plurality of nuts and the plurality of fuel injection elements, wherein the first flank angle is not less than 45 degrees.

2. The fuel injector according to claim 1, wherein the first flank angle is not more than 70 degrees.

3. The fuel injector according to claim 1, wherein the following side flank has surface roughness with arithmetic average roughness (Ra) of not more than 700 microinches.

4. The fuel injector according to claim 1, wherein the base portion forms a partition wall between a fuel chamber storing the fuel and an oxidant chamber storing oxidant used for combustion of the fuel.

5. The fuel injector according to claim 1, wherein the male screw portion of each projection of the plurality of projections includes a leading side flank forming a second flank angle with respect to the plane that is perpendicular to the axial direction, and wherein the second flank angle is smaller than the first flank angle.

6. The fuel injector according to claim 5, wherein the second flank angle is zero degrees.

* * * * *